Oct. 13, 1931.  W. H. LEAVENWORTH  1,827,709

MACHINE FOR MANUFACTURING FLOOR MATS FOR MOTOR VEHICLES

Filed Dec. 14, 1929

Inventor
William H. Leavenworth

By
Attorney

Patented Oct. 13, 1931

1,827,709

UNITED STATES PATENT OFFICE

WILLIAM H. LEAVENWORTH, OF AKRON, OHIO, ASSIGNOR TO THE GOODYEAR TIRE & RUBBER COMPANY, OF AKRON, OHIO, A CORPORATION OF OHIO

MACHINE FOR MANUFACTURING FLOOR MATS FOR MOTOR VEHICLES

Application filed December 14, 1929. Serial No. 414,049.

This invention relates to the manufacture of floor mats for motor vehicles, and it has particular relation to a machine for cutting the mats into desired contour.

An object of the invention is to provide a machine for cutting blanks from flexible sheet material in which means are employed for accurately positioning the material between cutting dies employed in the machine.

At the present time most motor vehicles are provided with floor mats composed of rubber and felted fabric. These mats are provided with openings for receiving operating levers projecting upwardly through the floor of the vehicle. Heretofore, it has been the practice to vulcanize a sheet of rubber and thereafter to cut a floor mat therefrom. Openings in the mat subsequently were provided by driving manually operated dies through the mat at predetermined locations. It is evident that this method was inefficient because of the fact that considerable vulcanized rubber apparently was wasted, which only could be reclaimed by expensive reclaiming processes.

According to this invention, it is proposed first to cut the mat to approximate dimensions from unvulcanized rubber and thereafter vulcanize each mat in a mold. During the vulcanizing of the mat, it is provided with an opening substantially centrally thereof which may be effected by means of a pin in the mold. After the vulcanizing operation, the mat is disposed between relatively movable platens, one of which is provided with die-cutting elements and the other with a removable plate having a pin adjustably secured thereon for cooperation with the opening in the mat. The pin on the plate locates the mat accurately with respect to the platens. Since the dimensions of the mat are approximately equal to those of the finished article and since the mat is accurately located between the platens by the pin and plate, the amount of material to be trimmed from the mat is reduced to a minimum. Consequently, the apparent waste of material correspondingly is minimized.

For a better understanding of the invention, reference may now be had to the accompanying drawings, forming a part of the specification, in which.

Figure 2:
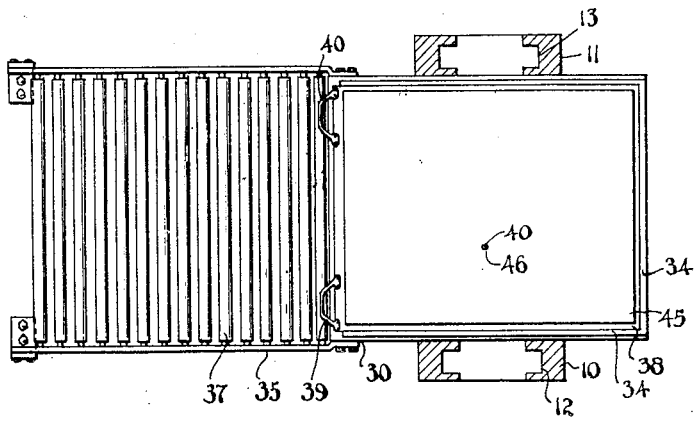
Fig. 2 is a cross-sectional view taken substantially along the line II—II of Fig. 1.
Figure 1:
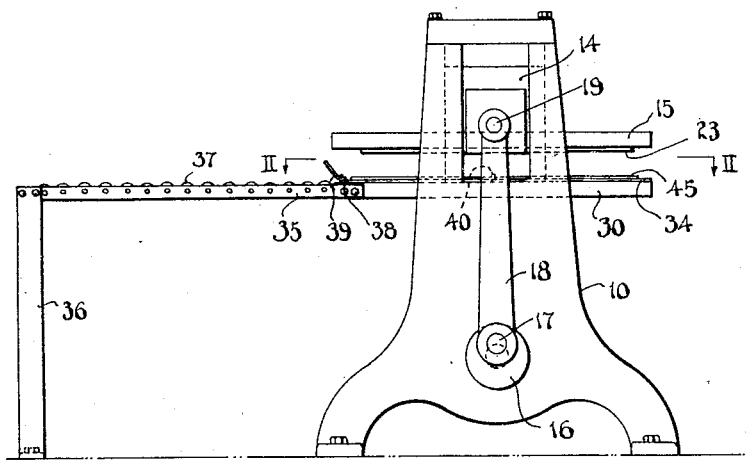
Fig. 1 is a side elevational view of a machine constructed according to one form of the invention.

Referring to Figs. 1 and 2, a pair of spaced vertically disposed frame members 10 and 11 are provided respectively, with vertically extending guideways 12 and 13. Blocks 14 slidably disposed in the guideways 12 and 13 are rigidly connected together by a platen 15. Movement of the blocks 14 in the guideways 12 and 13 is effected by means of a shaft 16 journalled in the lower portion of the frame members 10 and 11, and which is provided with eccentrically mounted pins 17, projecting outwardly from opposite ends of the shaft. These pins are journalled in the lower ends of connecting rods 18 which in turn have their upper ends pivotally connected to pins 19 projecting from the blocks 13 and 14.

Figure 3:
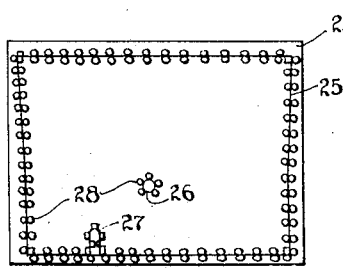
Fig. 3 is a view of a mat cutting die employed in the machine illustrating the arrangement of the several cutting elements thereof.

As best shown by Fig. 1, a die 23 is secured to the lower side of the platen 15. Preferably, the die is composed of wood, and as shown by Fig. 3, is provided with a metal cutting blade 25 in substantially rectangular form, which is partially embedded in the wood. This blade is employed for cutting the outer peripheral edge of a floor mat. A small circular blade 26 disposed substantially centrally of the blade 25 is employed for cutting a small circular opening in the mat for receiving one of the operating levers of a vehicle. Another blade 27 is adapted to cut an elongate recess in one side of the mat which opens to the outer edge thereof. It is to be understood, that the platen may be provided with metal cutting elements arranged in various forms in order to stamp mats of different types. At both sides of the blades, resilient elements 28 composed of rubber, cork and the like are cemented to the die. These elements project substantially to the outer or cutting elements of the blades and are resiliently compressed during the cutting operation in order to provide a means for freeing the mat from the blades following the cutting operation.

The uprights 10 and 11 also are provided with a stationary platen 30 which may be integral therewith or otherwise rigidly secured to the uprights. A frame 35 disposed in a horizontal plane, is secured at one end to an end of the platen 30, and at its other end to a pair of upright frame members 36. The frame 35 between its side members, rotatably supports a plurality of rollers 37. A plate 38 having a pair of handles 39 and 40 secured to one end thereof, is normally disposed on the upper surface of the stationary platen 30 and is adapted to be moved over the rollers 37. A small pin 40 is provided on the plate 38 substantially centrally thereof, which may be detachably secured to the plate by any suitable means such as cement, wax or the like. When the plate 38 is disposed in its normal position on the platen 30, the pin 40 is in alignment with the axis of the circular metal blade 26 on the die 23. A rail 34 rigidly mounted upon the platen 30, along the side edges and the rear edge thereof, determines the normal position of the plate 30 when it is moved upon the platen.

In the operation of the above-described machine, the plate 38 is moved to a position upon the rollers 37 and a floor mat 45 having a small opening 46 therein is so disposed upon the plate that the opening 46 engages the pin 40 on the plate, and one edge of the mat coincides with a chalk line made on the surface of the plate. Then the plate is moved to its normal position on the platen 30, in which position the pin 40 and the opening 46 are aligned with the axis of the opening 26 in the die 23. Rotation of the shaft 16 moves the platen 15 downwardly, which in turn, by means of the die 23, cuts the mat 45 to accurate dimensions and provides it with openings therein for receiving operating levers of a motor vehicle. The circular blade 26 cuts a small strip of material from the mat around the pin 40 thereby enlarging the opening 46 in the mat, and this enlarged opening also is adapted to receive one of the operating levers of the vehicle.

From the foregoing description, it is apparent that by means of the provision of an opening 46 in each mat and the removable plate 38 having the pin 40 thereon, the mat is accurately located on the lower platen 30 during the die-cutting operation. Also by reason of this construction an operator can locate mats with respect to the die 23 quickly and accurately, thereby obviating difficulties which would otherwise be encountered in properly locating a mat between platens. Moreover, it is apparent that although an opening initially is provided in the mat for the purpose of locating it properly, this opening is enlarged and subsequently is employed for receiving one of the operating levers of the vehicle.

Although only the preferred form of the invention has been described and illustrated, it will be apparent to those skilled in the art that the invention is not so limited but that various modifications may be made therein without departing from the spirit of the invention or from the scope of the appended claims.

What I claim is:

1. In apparatus for cutting sheet material, a pair of relatively movable platens, one of which is provided with die means for cutting sheet material, the other of which is provided with a pin projecting toward the first platen, the pin being adapted to fit in an opening in the sheet material for positioning the latter between the platens, said die means including a cutting blade so aligned with the pin that the die when cutting an aperture in the material, cuts around the pin.

2. In combination, a pair of relatively movable platens, one of which is provided with a die for cutting sheet material, the other of which is provided with a removable plate having a pin projecting therefrom towards the other platen, the pin being adapted for cooperation with a recess in the sheet material for positioning the latter between the platens, said die having an open portion aligned with the pin so that the die when cutting the material cuts completely around the pin.

3. In combination, a movable platen and a stationary platen, the movable platen being provided with a die for cutting sheet material, the stationary platen being provided with a slidably mounted plate having a pin projecting toward the movable platen, the pin being adapted for cooperation with a recess in the sheet material for positioning the latter between the platens, said die having an open portion aligned with and completely surrounding the pin so that the die, when cutting the material, will remove the material containing the recess, whereby a minimum of waste material will result.

4. An apparatus for cutting sheet material comprising a pair of relatively movable platens, a plate slidably mounted on one of the platens, means for normally positioning said plate on the platen, a pin on the plate cooperating with a hole in the sheet material to position the latter on the plate, die means on the other platen including means for cutting an aperture in the sheet material, the pin being positioned on the plate so that the hole in the sheet cooperating with the pin will be in the material removed from the aperture by the die means.

In witness whereof, I have hereunto signed my name.

Signed at Akron, in the county of Summit and State of Ohio, U. S. A., this 13th day of December, 1929.

WILLIAM H. LEAVENWORTH.